United States Patent [19]

Jones

[11] Patent Number: 4,508,293
[45] Date of Patent: Apr. 2, 1985

[54] SEEKER-BODY DECOUPLING SYSTEM

[75] Inventor: Richard W. Jones, La Verne, Calif.

[73] Assignee: General Dynamics, Pomona Division, Pomona, Calif.

[21] Appl. No.: 397,255

[22] Filed: Jul. 12, 1982

[51] Int. Cl.³ .............................................. F41G 7/22
[52] U.S. Cl. ................................................. 244/3.15
[58] Field of Search ............... 244/3.15, 3.16, 3.19, 244/3.2, 3.21; 318/648

[56] References Cited

U.S. PATENT DOCUMENTS

| | | | |
|---|---|---|---|
| 2,710,729 | 6/1955 | Meredith | 244/77 |
| 2,826,380 | 3/1958 | Ketchledge | 244/3.16 |
| 3,008,668 | 11/1961 | Darlington | 244/3.11 |
| 3,111,088 | 11/1963 | Fisk | 244/3.16 |
| 3,260,205 | 7/1966 | Dietrich | 244/3.23 |
| 3,309,963 | 3/1967 | Salomonsson | 89/41 |
| 3,323,757 | 6/1967 | Cole | 244/3.16 |
| 3,351,303 | 11/1967 | Depew, Jr. et al. | 244/3.16 |
| 3,362,658 | 1/1968 | Ito et al. | 244/3.2 |
| 3,424,010 | 1/1969 | Pollack | 244/79 |
| 3,443,476 | 5/1969 | Heider et al. | 89/41 |
| 3,504,247 | 3/1970 | Hamel | 318/18 |
| 3,523,659 | 8/1970 | Epperson, Jr. | 244/3.17 |
| 3,527,429 | 9/1970 | Hawes, Jr. et al. | 244/3.14 |
| 3,578,796 | 5/1971 | Hagler et al. | 244/3.23 |
| 3,603,532 | 9/1971 | Harms | 244/3.21 |
| 3,636,324 | 1/1972 | Dommasch | 244/3.15 |
| 3,657,524 | 4/1972 | Bakke | 318/561 |
| 3,690,596 | 9/1972 | Durran et al. | 244/3.21 |
| 3,741,500 | 6/1973 | Liden | 244/3.2 |
| 3,843,075 | 10/1974 | Weber et al. | 244/3.15 |
| 3,897,918 | 8/1975 | Gulick, Jr. et al. | 244/3.19 |
| 4,016,469 | 4/1977 | Lanni et al. | 318/648 |
| 4,029,270 | 6/1977 | Niemeier | 244/3.21 |
| 4,054,254 | 10/1977 | Cole | 244/3.21 |
| 4,136,844 | 1/1979 | Maudal | 244/3.2 |
| 4,196,380 | 4/1980 | Gustavsson et al. | 318/648 |
| 4,396,878 | 8/1983 | Cole et al. | 244/3.15 |

*Primary Examiner*—Charles T. Jordan
*Attorney, Agent, or Firm*—Neil F. Martin; Lawrence A. Maxham; Edward B. Johnson

[57] ABSTRACT

An improved airframe body decoupling system for a body gimballed sensor on an interceptor aircraft or guided missile. Body rate gyro information is employed for internal decoupling so as to eliminate decoupling match sensitivity to receiver errors. The true measure of sensor position from the gimballed antenna potentiometer is differentiated and then externally decoupled to produce the desired line-of-sight rate for use by the guidance/control section of the proportional navigation guidance system.

8 Claims, 4 Drawing Figures

SEEKER-BODY DECOUPLING SYSTEM

GOVERNMENT CONTRACT

The Government has rights in this invention pursuant to Contract No. F33657-79-C-0469, awarded by the U.S. Air Force.

FIELD OF THE INVENTION

This invention relates generally to guidance of interceptor aircraft or guided missiles and more particularly concerns such an air vehicle with a body gimballed sensor and means for decoupling the body motion of the vehicle in order to provide a refined line-of-sight rate to a target.

BACKGROUND OF THE INVENTION

In a typical proportional navigation guidance system for an air vehicle such as a guided missile, the magnitude and direction of the missile-to-target line-of-sight rate of change is normally measured by a receptor, often referred to as an antenna or a seeker, and this output is used to control the rate of change of the missile velocity in both magnitude and direction through the guidance/control section. The primary measurement performed by the seeker antenna is the error angle between the missile-to-target line-of-sight and the antenna electrical boresight.

In a body gimballed sensor system, the angle sensed by the antenna leads to an output which is proportional not only to the desired missile-to-target line-of-sight rate of change but also to missile body turning rate. A gimballed antenna cannot be used to produce an inertial rate such as a line-of-sight rate without the summation of the body rate occurring in the seeker. This is because a body gimballed sensor is not inertially referenced. If this seeker signal, which includes information proportional to the missile body turning rate, is fed to the missile control system, a closed loop is created. This loop, commonly referred to as a body coupling loop, is normally undesirable in that it will adversely affect the stability and guidance accuracy of the missile.

In vehicles which utilize a body referenced or body gimballed sensor it has been suggested to either internally or externally decouple body motion in order to achieve the desired line-of-sight rate with respect to space. Externally decoupling the body rate is normally achieved by summing the body rate with the receiver output, that is, the beta dot command ($\dot{\beta}_c$) signal. A drawback of such external decoupling is that receiver errors (gain, phase, quadrature errors) degrade the coupling match. Because the externally decoupled body rate signal must be dynamically matched to the closed loop seeker response and receiver errors change the closed loop response, the need is created for very tight tolerances on the receiver errors. This translates into time and money.

Internal decoupling is accomplished by summing the body rate with the signal out of the receiver to produce a beta dot command signal. Internal decoupling transforms the body gimballed sensor into a surrogate space stabilized sensor. The problem that arises with a surrogate space stabilized sensor is that drifts and biases within the servo rate loop, which positions the antenna, cause a bias in the line-of-sight rate and such biases can degrade performance. Again, to eliminate problems of this type, expensive hardware must be used within the servo rate loop to minimize the biases.

Space stabilized, inertially referenced sensors and body fixed antenna systems are not applicable to the aforementioned decoupling system. By definition, a space stabilized sensor is intrinsically decoupled from body motion. Body fixed sensors are rigidly fixed to the vehicle and therefore cannot be commanded to move to compensate for vehicle body motion. Hence, internal decoupling cannot be utilized for either system.

SUMMARY OF THE INVENTION

This invention employs both internal and external decoupling of the track loop. Since both internal and external decoupling methods have errors and disadvantages because of decoupling mismatches, it would appear that two such decoupling steps would degrade performance. However, contrary to what would be expected, performance is dramatically improved and the combination of the two decoupling methods is substantially better than either decoupling method functioning individually.

The servo rate loop employed in the track loop of this invention has a response time many times faster than the autopilot/airframe response. This relationship, as employed in this invention, eliminates the need for matching the internally decoupled body rate signal dynamically to the servo rate loop.

The output of the signal processor or receiver is a measure of the line-of-sight rate. Internal decoupling is accomplished by summing the negative of the body rate with the receiver output signal to produce a beta dot command input to the rate servo. This negative body rate results in the antenna moving equal and opposite to the airframe body motion so that the antenna position in space remains independent of the body motion. A potentiometer measures the antenna gimbal angle. After this measurement is differentiated to obtain the rate of change of the antenna motion, external decoupling is accomplished by summing that signal with the body rate measurement. This produces a refined measure of the line-of-sight rate which is then passed on to the guidance/control section of the missile guidance system.

BRIEF DESCRIPTION OF THE DRAWING

The objects, advantages and features of this invention will be more readily apparent from the following detailed description when read in conjunction with the accompanying drawing in which.

DESCRIPTION OF THE PREFERRED EMBODIMENT

Figure 1:
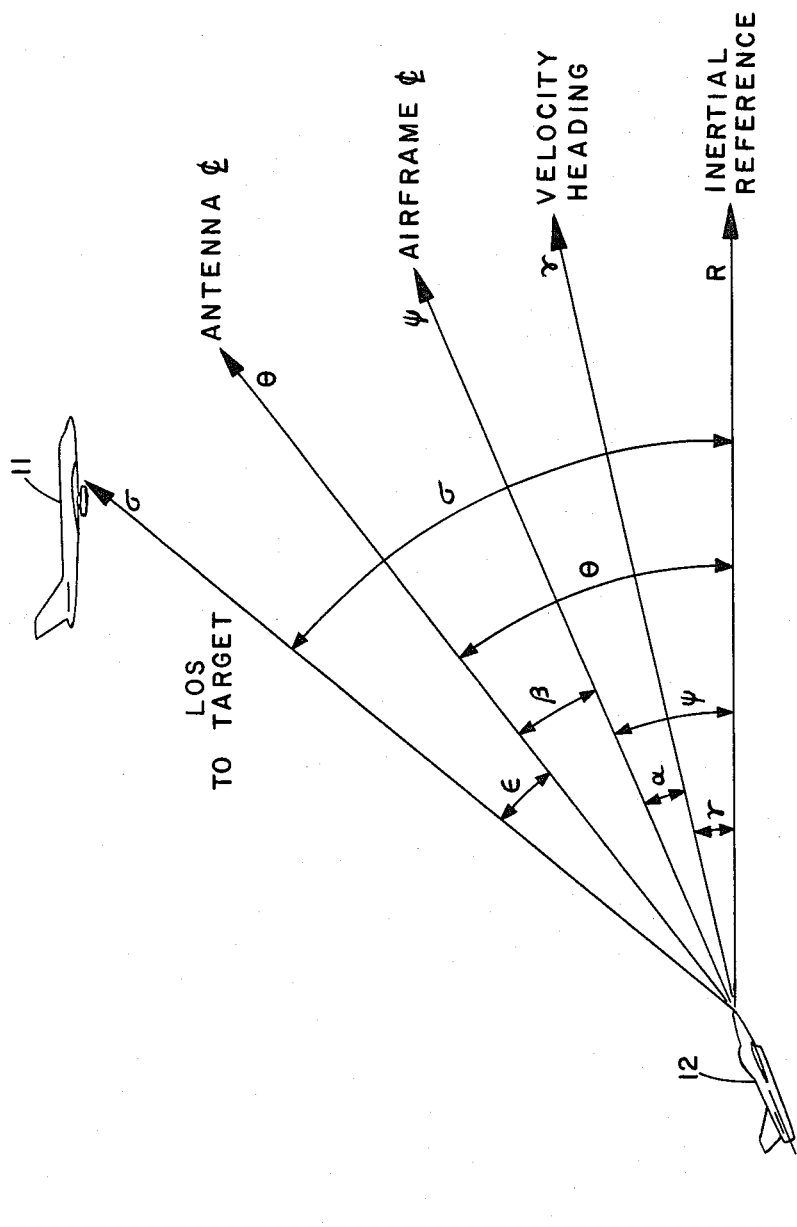
FIG. 1 is a single plane geometric vector representation of a proportional navigation guidance system.

The present invention is an integral part of a proportional navigation guidance system for an air vehicle such as a guided missile. A single plane vector representation of such a system is illustrated in FIG. 1. This system makes use of information received from the target 11 by means of an antenna or seeker on board the missile 12. The information may be reflected electromagnetic energy generated by a mother ship radar which illuminates the target, or it might be an infrared or other appropriate sensor means for detecting the presence and location of the target. Energy from target 11 is received by a suitable receptor on board missile 12 along the missile-to-target line-of-sight (LOS) vector $\sigma$. The LOS is measured as the angle $\sigma$ from an inertial reference line R. The center line of the antenna, that is, its physical pointing direction, is represented by the angle $\theta$ and the airframe center line is represented by the angle $\psi$ with respect to inertial reference line R. The angle $\beta$ between the airframe angle and the antenna angle is referred to as the look angle. The angle by which the antenna is displaced from the LOS is the pointing error $\epsilon$. The missile velocity vector $\gamma$ is displaced from the airframe axis angle $\psi$ by the angle of attack $\alpha$.

It should be understood that while FIG. 1 is a single plane vector representation of elevation angles of a proportional navigation guidance system, there would be another similar plane normal to the plane of FIG. 1 by which azimuth angles would be determined. The principles of this invention would apply equally to the azimuth vectors but there is no need to complicate the description, it being adequate to disclose the system with respect to single plane vectors.

Figure 2:
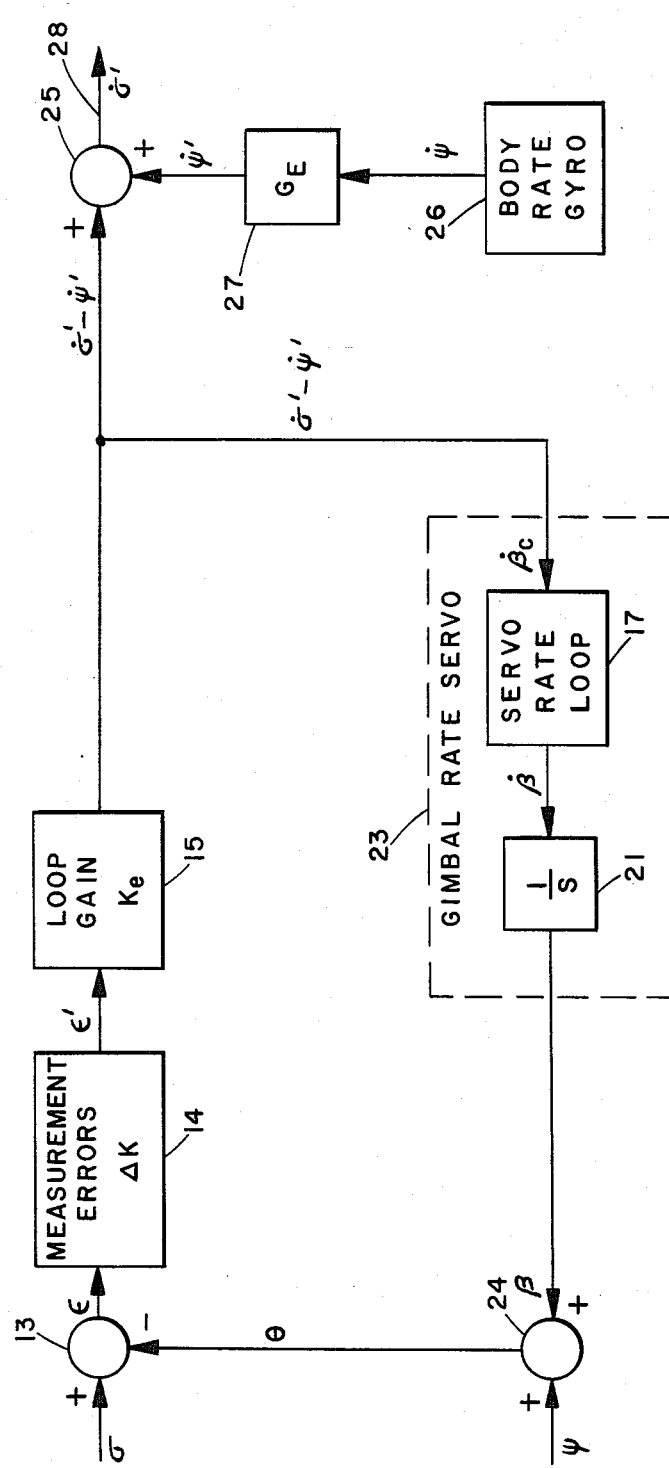
FIG. 2 is a schematic diagram of a body gimballed sensor with external decoupling.

A track loop for a body gimballed sensor with external body decoupling is shown in FIG. 2. The inputs to combining point 13 are LOS angle $\sigma$ and antenna angle $\theta$. The output of this combining point is true antenna pointing error $\epsilon$ and from this and from FIG. 1 we can see a basic geometric relationship $$\epsilon = \sigma - \theta. \tag{1}$$

This value is modified by the receiver errors $\Delta K$ indicated by block 14 as measurement errors, the output of which is the measured pointing error $\epsilon'$. This value is multiplied by the loop gain $K_\epsilon$ in block 15. Blocks 14 and 15 may be referred to as the signal processor. The output of the signal processor, which is the receiver output, is $\dot{\sigma}' - \dot{\psi}'$ or the LOS rate relative to the airframe. This value may be referred to as the beta dot command signal ($\dot{\beta}_c$) with the relationship $$\dot{\beta}_c = \dot{\sigma}' - \dot{\psi}'. \tag{2}$$

The receiver output signal is then fed back through gimbal rate servo 23 to combining point 24 where the look angle $\beta$ output of the gimbal rate servo is coupled with a representation of body angle $\psi$, resulting in antenna angle $\theta$ for input to combining point 13. Gimbal rate servo 23 is shown as comprised of servo rate loop 17, by which the antenna angle is controlled by $\dot{\beta}_c$, together with a representation of an integrator 21. This latter element effectively comprises the gimbal potentiometer which provides the true position $\beta$ of the antenna with respect to the airframe. For reference purposes it may be stated that $$\beta = \sigma - \psi - \epsilon. \tag{3}$$

At the left side of FIG. 2 the inputs $\sigma$, $\psi$ and $\epsilon$ are commonly referred to as geometry inputs rather than being measured values. This is a term which is well understood in the trade and needs no further explanation here.

Notice that the description to this point includes a body angle input $\psi$, which cannot be prevented in a body gimballed antenna. This explains why the receiver output includes an LOS rate component and a body rate component. External decoupling is accomplished at the upper right portion of the diagram of FIG. 2 wherein the LOS rate relative to airframe $\dot{\sigma}' - \dot{\psi}'$ is coupled at combining point 25 with $\dot{\psi}'$, which is body rate gyro information $\dot{\psi}$ multiplied by decoupling gain $G_E$. Gain $G_E$ is necessary to match the body rate from gyro 26 with the dynamics of the track loop. It may be seen by inspection that the output of combining point 25 on line 28 is $\dot{\sigma}'$, the LOS rate relative to space. This comes from the relationship at the combining point $$\dot{\sigma}' = \dot{\sigma}' - \dot{\psi}' + \dot{\psi}' \tag{4}$$

The output of the receiver, $\dot{\sigma}' - \dot{\psi}'$, is subject to the dynamics of the track loop. The only way for the output of the system to be a relatively accurate measure of LOS rate relative to space, the term necessary for the guidance/control section of the missile guidance system, is for the quantity $\dot{\psi}'$ in the output term to be exactly cancelled by the body rate measurement term $\dot{\psi}$ from body rate gyro 26. This can occur if the decoupling gain $G_E$ exactly matches the dynamics of the track loop so that the $\dot{\psi}'$ input is exactly equal and opposite in sign to the $\dot{\psi}'$ component of the input from the receiver.

Figure 3:
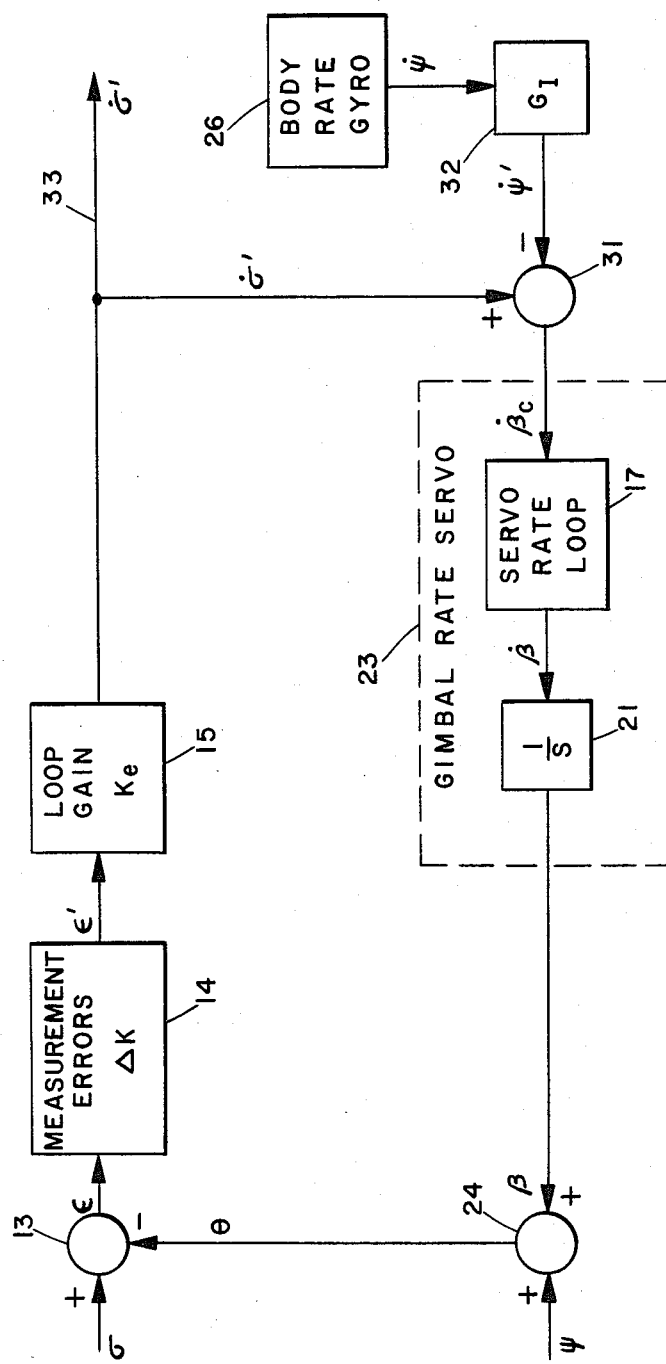
FIG. 3 is a schematic diagram of a body gimballed sensor with internal decoupling.

The schematic diagram in FIG. 3 is similar to that in FIG. 2 except that internal body decoupling is employed. The track loop and the inputs are as described with respect to FIG. 2. However, between the receiver output and the input to the gimbal rate servo, combining point 31 has been added to couple an additional input to the receiver output, this being the body rate term $\dot{\psi}$ as modified by decoupling gain $G_I$, represented by block 32. The beta dot command signal output of combining point 31 is formulated as $$\dot{\beta}_c = \dot{\sigma}' - \dot{\psi}' \tag{5}$$

Although $\dot{\beta}_c$ has the same formulation in FIG. 3 as in FIG. 2, the body rate portion in FIG. 3 comes from a direct input of body rate multiplied by the gain $G_I$ which is the electronic match to gimbal rate servo. In FIG. 2 the body rate term of the receiver output stemmed from the undesired but inevitable body coupling originating at combining point 24. At this point it can be seen that the feedback portion of the track loop includes a body decoupling term which, upon reaching combining point 24,1 cancels the body angle coupled into the track loop at that point. Thus the input to combining point 13 is free of body coupling and the signal processing portion of the track loop has no body coupling term so that the output $\dot{\sigma}'$ thereof on line 33 is a measure of LOS rate relative to space, the term which the guidance/control section of the missile guidance system employs. As previously stated, this receiver output suffers from the errors mentioned above.

Figure 4:
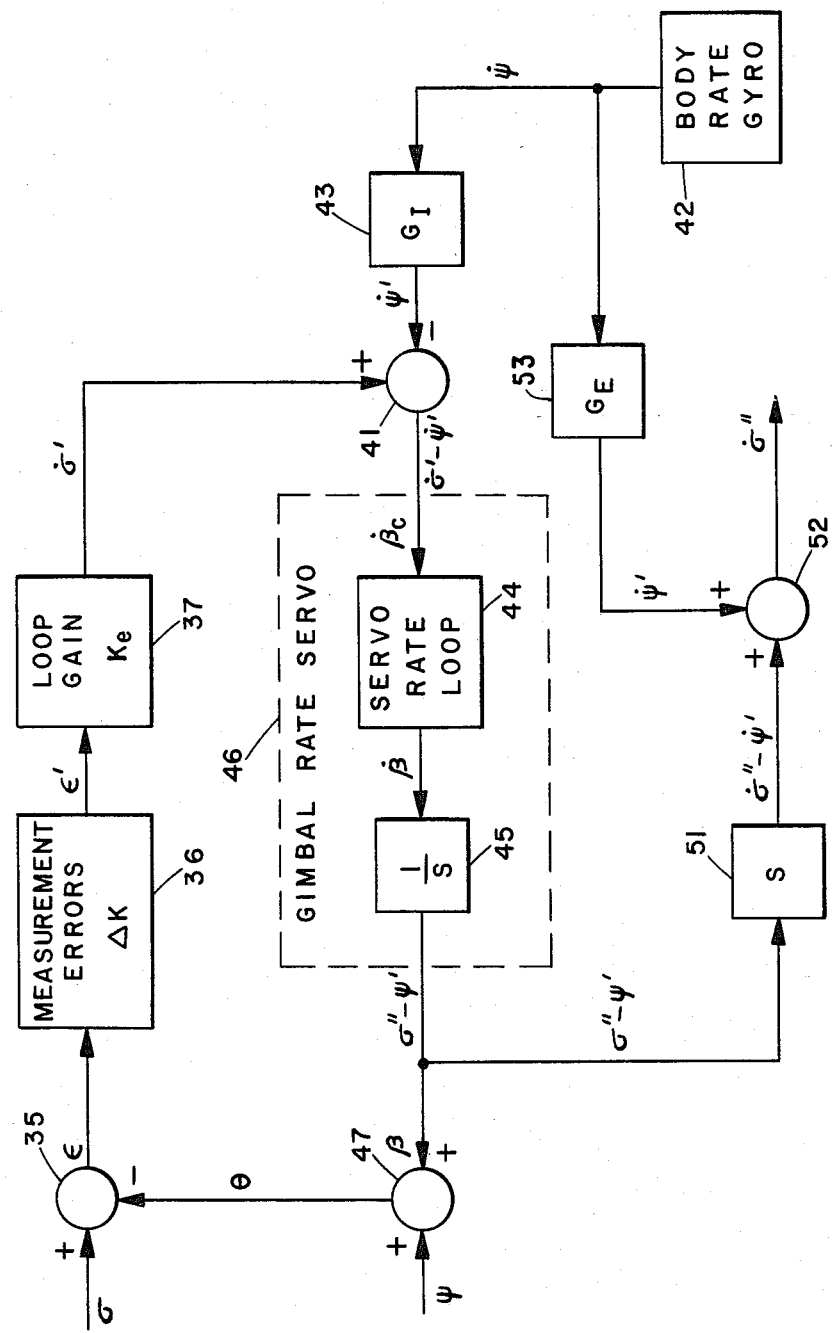
FIG. 4 is a schematic diagram of a body gimballed sensor with combined internal and external decoupling in accordance with the invention.

The invention, which is a combination of internal and external decoupling, is shown in FIG. 4. In this system, LOS angle $\sigma$ and antenna angle $\theta$ are applied to combining point 35 to produce the pointing error $\epsilon$ which is acted upon by blocks 36 and 37, the measurement errors and loop gain as described above. The receiver output is $\dot{\sigma}'$, the LOS rate relative to space. This LOS rate is applied to combining point 41 along with $\dot{\psi}'$ which is body rate $\dot{\psi}$ from body rate gyro 42 multiplied by decoupling gain $G_I$ in block 43. The output of combining point 41 is the command signal $\dot{\beta}_c$ which is applied to gimbal rate servo 46 as before. The output of servo 46 is look angle $\beta$ which is applied to combining point 47 where body angle $\psi$ is indicated as also being coupled into the track loop. As stated with respect to FIG. 3, at this point the coupled body angle is balanced by the body angle term which was coupled at combining point 41 so that the output of the receiver is the internally decoupled LOS rate. However, this receiver output is still subject to possible drifts and biases.

The measured value of look angle $\beta$ at the output of rate servo 46 is comprised of the LOS and body angles in the form $\sigma'' - \psi'$. External decoupling is applied to this measured look angle. The term $\sigma'' - \psi'$ is differentiated in block 51 to provide $\dot{\sigma}'' - \dot{\psi}'$, and then that differentiated output and body rate $\dot{\psi}'$, derived from body rate $\psi$ from body rate gyro 42 multiplied by decoupling gain $G_E$ in block 53 are applied at combining point 52 so that the final output is $\dot{\sigma}''$, from the relation $$\dot{\sigma}'' = \dot{\sigma}'' - \dot{\psi}' + \dot{\psi}', \qquad (6)$$

the desired refined value of the LOS rate. This rate has now been effectively both internally and externally decoupled to provide an improved and refined measure of LOS rate $\dot{\sigma}''$ for use by the guidance/control section of the missile guidance system.

Contrary to what one would expect, with body decoupling performed twice where the possibility of mismatch occurs each time, the performance of the present invention is dramatically improved over a system which only internally or externally decouples body motion. Part of the reason for this advantageous result is that the servo rate loop generally has a response time approximately ten times faster than the autopilot/airframe response. This relationship eliminates the need for matching the internally decoupled body rate signal dynamically to the servo rate loop. Stated another way, gain $G_I$ in FIG. 4 has a value of unity.

Internal decoupling has normally been preferred as an alternative to external decoupling because it is insensitive to receiver errors such as phase, gain and quadrature errors whereas external body decoupling is directly affected by any type of receiver error because such decoupling is matched to the closed loop dynamics of the seeker. However, internal decoupling is subject to drifts and biases in the servo rate loop. Energy reflected or emitted by a target is sensed by the antenna/receiver system of the missile, the information obtained being a measure of the pointing error in elevation or azimuth in the single plane system being described herein. Because the gimbalIed sensor is internally body decoupled this pointing error is independent of body motion, that is, the sensor position in space is independent of airframe body motion. More specifically, the pointing error $\epsilon$ is measured by the antenna and multiplied by a gain $K_\epsilon$ in the signal processing section of the track loop. The output of the signal processor is defined as $\dot{\sigma}'$ because it is a measure of the line of sight rate. This signal is normally passed on to the guidance/control section of the missile. However, using the decoupling system of the present invention, the LOS rate signal is passed on to the rate servo that positions the antenna after being combined with the negative of the body rate as shown in the right hand portion of FIG. 4. The negative body rate input results in the antenna moving equal and opposite with respect to the airframe body motion, so that the antenna position in space remains independent of body motion.

To avoid the pitfalls associated with internal decoupling, that is, rate servo drifts and biases, the antenna gimbal or look angle $\beta$ measured by a potentiometer is used to generate the line-of-sight rate instead of using the commonly employed beta dot command signal out of the receiver as shown in FIG. 2. By using $\beta$ the seeker loop configuration is transformed in such a way that drifts and biases in the servo rate loop are eliminated without the use of expensive hardware. Essentially, by this method biases are shifted to the forward path of the seeker as opposed to the feedback path. Biases in the forward path generate a constant error in look angle $\beta$ but since that value is differentiated in block 51 the errors are driven to zero and thus eliminated. To generate the desired line of sight rate, this differentiated signal is then summed with the body rate and external decoupling is thereby accomplished. Because the body rate has been internally decoupled, only the dynamics of the servo rate loop act on the decoupled body rate signal and the dynamics of the seeker need not be dynamically matched externally to ensure accurate decoupling. Thus gain $G_E$ can also be unity, thereby contributing significantly to the cost effectiveness of the system. As previously stated, because the dynamics of the servo rate loop are much faster than the autopilot/airframe response, decoupling dynamics need not be taken into account. More importantly, receiver errors do not alter servo dynamics and therefore do not affect the external decoupling match.

By means of this decoupling system, the effectiveness of the body gimballed sensor is maximized and the body gimballed sensor system is enabled to reach its full potential in a cost effective manner.

This invention is primarily intended for non-rolling missiles. However, the concept, with additional complexities engendered by the fact that the look angle $\beta$ would be sinusoidal, could be applied to rolling missiles.

What is claimed is:

1. A method for body motion decoupling of a body gimballed antenna in a proportional navigation missile guidance system for a missile airframe, said guidance system comprising a track loop, a guidance/control section and a body rate gyro having a body rate output $\dot{\psi}$, said track loop having inputs representing body angle $\psi$ and LOS angle $\delta$ and deriving antenna angle $\theta$, said track loop including a loop gain $K_\epsilon$ and measurement errors which together comprise a receiver, said method comprising the steps of:

combining angles $\delta$ and $\theta$ at a first combining point to provide an output signal $\epsilon$ representing the antenna pointing error;

multiplying the angle $\epsilon$ by said measurement errors and said loop gain to provide a first measured LOS rate $\dot{\sigma}'$ at the output of said receiver;

combining LOS rate $\dot{\sigma}'$ and body rate $\dot{\psi}'$ at a second combining point to provide antenna command signal $\dot{\beta}_c = \dot{\sigma}' - \dot{\psi}'$;

applying said command signal to a gimbal rate servo to position said antenna, the output of said gimbal rate servo being the antenna position with respect to the airframe or look angle $\beta$ where $\beta = \sigma'' - \psi'$;

coupling said body angle $\psi$ and said look angle $\beta$ at a third combining point to provide said antenna angle $\theta$;

differentiating said look angle $\beta$ to provide $\dot{\sigma}'' - \dot{\psi}'$; and combining said body rate $\dot{\psi}'$ with $\dot{\sigma}''-\dot{\psi}'$ at a fourth combining point to provide a refined second LOS rate $\dot{\sigma}''$ for use by said guidance/control section of said guidance system.

2. The method recited in claim 1 wherein said body rate $\dot{\psi}$ is multiplied by decoupling gain $G_I$ prior to combining with $\dot{\sigma}'$.

3. The method recited in claim 2 wherein said body rate $\dot{\psi}$ is multiplied by decoupling gain $G_E$ prior to combining with $\dot{\sigma}''-\dot{\psi}'$.

4. The method recited in claim 3 wherein said gimbal rate servo includes a servo rate loop and said missile guidance system includes an autopilot for controlling the missile airframe, wherein the response time of said servo rate loop is in the order of ten times faster than the response time of said autopilot/airframe.

5. The method recited in claim 4 wherein said decoupling gains $G_I$ and $G_E$ have a value of unity.

6. Apparatus for decoupling body motion in a proportional navigation missile guidance system having a body gimballed antenna, a track loop signal processor and a guidance/control section which includes an autopilot for controlling the missile airframe, said track loop having inputs representing LOS angle $\sigma$ and antenna angle $\theta$, the receiver output of said track loop being a measured of LOS rate $\dot{\sigma}'$, the LOS angle being applied to a gimbal rate servo, the output of said servo being a measure of the antenna look angle $\beta$ where $\beta$ is a function of LOS angle $\sigma$ and missile body angle $\psi$, in the form $\beta=\sigma''-\psi'$, the look angle being combined with the body angle $\psi$ to provide said antenna angle $\theta$, wherein the improvement comprises:

a first combining point connected between the output of said receiver and said servo;

a body rate gyro having an output signal $\dot{\psi}'$ coupled to said first combining point to combine body rate $\dot{\psi}'$ with LOS rate $\dot{\sigma}'$ at the input of said rate servo, thereby internally decoupling said body rate from said track loop;

a differentiator coupled to the output of said rate servo to differentiate the look angle signal $\sigma''-\psi'$ to provide $\dot{\sigma}''-\dot{\psi}'$;

a second combining point connected to the output of said differentiator;

said body rate gyro being coupled to said second combining point to combine body rate $\dot{\psi}'$ with $\dot{\sigma}''-\dot{\psi}'$, thereby externally decoupling said body rate from said track loop;

whereby the output of said second combining point is a refined LOS rate $\dot{\sigma}''$ which is adapted to be employed by said guidance/control section of said gimbal system.

7. The apparatus recited in claim 6 wherein said gimbal rate servo comprises a servo rate loop, the response time of said servo rate loop being in the order of ten times faster than the response time of said autopilot/airframe.

8. The apparatus recited in claim 6 wherein the input signal to said gimbal rate servo is $\beta_c=\sigma'-\psi'$, the positioning command signal for said antenna.

* * * * *